(12) United States Patent
Nezaki et al.

(10) Patent No.: US 11,235,722 B2
(45) Date of Patent: Feb. 1, 2022

(54) SEATBELT SYSTEM FOR VEHICLE, AND CONTROL METHOD FOR SEATBELT SYSTEM

(71) Applicant: Toyota Jidosha Kabushiki Kaisha, Toyota (JP)

(72) Inventors: Takuya Nezaki, Mizunami (JP); Motoki Sugiyama, Kasugai (JP); Fumihito Komeno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 16/597,004

(22) Filed: Oct. 9, 2019

(65) Prior Publication Data

US 2020/0114853 A1     Apr. 16, 2020

(30) Foreign Application Priority Data

Oct. 12, 2018   (JP) .............................. JP2018-193769

(51) Int. Cl.
| | |
|---|---|
| *B60R 21/0134* | (2006.01) |
| *B60R 21/013* | (2006.01) |
| *B60R 21/01* | (2006.01) |

(52) U.S. Cl.
CPC .............................. *B60R 21/0134* (2013.01); *B60R 2021/01013* (2013.01); *B60R 2021/01272* (2013.01); *B60R 2021/01279* (2013.01); *B60R 2021/01317* (2013.01)

(58) Field of Classification Search
CPC ...... B60R 21/0134; B60R 2021/01013; B60R 2021/01279; B60R 2021/01317

USPC .......................................................... 701/45
See application file for complete search history.

(56) References Cited

U.S. PATENT DOCUMENTS

| | | | |
|---|---|---|---|
| 2004/0108706 A1 | 6/2004 | Enomoto | |
| 2005/0061904 A1* | 3/2005 | Inuzuka | B60R 22/3413 242/379.1 |
| 2007/0090224 A1* | 4/2007 | Ng | B60R 22/46 242/374 |
| 2011/0035117 A1* | 2/2011 | Yamada | B60R 22/4676 701/45 |
| 2015/0100208 A1 | 4/2015 | Wogel et al. | |

FOREIGN PATENT DOCUMENTS

| | | |
|---|---|---|
| JP | 2001-247009 A | 9/2001 |
| JP | 2004-182153 A | 7/2004 |
| JP | 2011-126332 A | 6/2011 |

* cited by examiner

*Primary Examiner* — Gertrude Arthur Jeanglaude
(74) *Attorney, Agent, or Firm* — Dinsmore & Shohl LLP

(57) ABSTRACT

A seatbelt system includes a take-up device configured to take up a seatbelt, and an electronic control unit configured to, when any one of first and second conditions is satisfied, cause a motor to take up the seatbelt. In the first condition, after occurrence of a collision whose physical quantity detected by a detector configured to detect the physical quantity associated with a magnitude of the collision is less than or equal to a first threshold, the physical quantity decreases to less than or equal to a second threshold. In the second condition, after occurrence of a collision whose physical quantity is less than or equal to the first threshold, a first predetermined time elapses, which is estimated to be equivalent to a decrease in the physical quantity to less than or equal to the second threshold.

9 Claims, 6 Drawing Sheets

SEATBELT SYSTEM FOR VEHICLE, AND CONTROL METHOD FOR SEATBELT SYSTEM

CROSS-REFERENCE TO RELATED APPLICATIONS

This application claims priority to Japanese Patent Application No. 2018-193769 filed on Oct. 12, 2018, which is incorporated herein by reference in its entirety including the specification, drawings and abstract.

BACKGROUND

1. Technical Field

The disclosure elates to a seatbelt system for a vehicle, and a control method for a seatbelt system.

2. Description of Related Art

Japanese Unexamined Patent Application Publication No. 2011-126332 (JP 2011-126332 A) describes a technique for making it possible to take up a seatbelt in the event of a minor collision in an initial stage of multiple collisions by, when it is determined that an acceleration represented by an impact signal is less than an predetermined value, driving a motor forward to take up the seatbelt.

SUMMARY

The technique described in JP 2011-126332 A immediately takes up a seatbelt as a collision occurs. However, even in the event of a minor collision, a collision acceleration is applied to an occupant to displace the occupant, with the result that the tension of the seatbelt increases. For this reason, as in the case of the technique described in JP 2011-126332 A, to take up a seatbelt immediately after occurrence of a collision, a high torque needs to be generated by the motor, so the size of the motor increases or the current flowing through the motor increases.

The disclosure restricts a required torque from a motor when a seatbelt is taken up by driving three of the motor in the event of a minor collision in preparation for multiple collisions.

The disclosure relates to a seatbelt system, for a vehicle, and a control method for a seatbelt system. The seatbelt system includes a take-up device configured to take up a seatbelt by using driving force of a motor, and an electronic control unit configured to, when any one of a first condition and a second condition is satisfied, cause the motor to take up the seatbelt. The first condition is a condition in which, after occurrence of a collision whose physical quantity detected by a detector configured to detect the physical quantity associated with a magnitude of the collision is less than or equal to a first threshold, the physical quantity decreases to less than or equal to a second threshold less than the first threshold. The second condition is a condition in which, after occurrence of a collision whose physical quantity is less than or equal to the first threshold, a first predetermined time elapses, which is estimated to be equivalent to a decrease in the physical quantity to less than or equal to the second threshold.

With the above configuration, the take-up device takes up the seatbelt by using the driving force of the motor. In multiple collisions, there is a certain time difference between the first collision and the second collision. Using this time difference, the electronic control unit, when there occurs a collision whose physical quantity detected by the detector configured to detect the physical quantity associated with the magnitude of a collision is less than or equal to the first threshold, causes the motor to take up the seatbelt after the physical quantity decreases to less than or equal to the second threshold less than the first threshold or the predetermined time elapses, which is estimated to be equivalent to a decrease in the physical quantity to less than or equal to the second threshold.

When the physical quantity associated with the magnitude of a collision is less than or equal to the second threshold, the tension of the seatbelt is also reduced accordingly, so the motor is able to take up the seatbelt with a low torque. When there occurs a first collision whose physical quantity associated with the magnitude of the collision is less than or equal to the first threshold and then there occurs a second collision as well, a displacement of an occupant is returned before the occurrence of the second collision. Therefore, with the above configuration, a required torque from the motor is restricted when the seatbelt is taken up by the driving force of the motor in preparation for multiple collisions in the event of a minor collision. Hence, an increase in the size of the motor or a large current flowing through the motor to generate a high torque is avoided.

In the seatbelt system, the take-up device may include a pretensioner configured to increase a tension of the seatbelt by taking up the seatbelt. The electronic control unit may be configured to, when, there occurs a collision whose physical quantity exceeds the first threshold, activate the pretensioner.

With the above configuration, when there occurs a collision whose physical quantity associated with the magnitude of the collision exceeds the first threshold, the tension of the seatbelt is increased, by activating the pretensioner, so the occupant is reliably restrained when there occurs a collision whose physical quantity exceeds the first threshold.

In the seatbelt system, the take-up device may include a force limiter configured to reduce the tension of the seatbelt taken up by the pretensioner to less than or equal to a predetermined value. The electronic control unit ma be configured to, when any one of a third condition and a fourth condition is satisfied, cause the motor to take up the seatbelt. The third condition may be a condition in which, after the pretensioner is activated, the physical quantity decreases to less than or equal to the second threshold. The fourth condition may be a condition in which, after the pretensioner is activated, a second predetermined time elapses, which is estimated to be equivalent to a decrease in the physical quantity to less than or equal to the second threshold.

When the take-up device includes a force limiter, the tension of the seatbelt taken up by the pretensioner is reduced to less than or equal to the predetermined value by the force limiter, so a slack of the seatbelt can occur. With the above configuration, after the pretensioner is activated, the seatbelt is taken up by the motor when the physical quantity decreases to less than or equal to the second threshold or the predetermined time elapses, which is estimated to be equivalent to a decrease in the physical quantity to less than or equal to the second threshold. Thus, while a required torque from the motor is restricted, a slack of the seatbelt, which occurs when the force limiter is activated, is taken up.

A second aspect of the disclosure is a control method for a seatbelt system. The seatbelt system includes a take-up device configured to take up a seatbelt by using driving force of a motor, and an electronic control unit. The control method includes controlling the motor, by the electronic control unit, such that the seatbelt is taken up by the motor when any one of a first condition and a second condition is satisfied. The first condition is a condition in which, after occurrence of a collision whose physical quantity detected by a detector configured to detect the physical quantity associated with a magnitude of the collision is less than or equal to a first threshold, the physical quantity decreases to less than or equal to a second threshold less than the first threshold. The second condition is a condition in which, after occurrence of a collision whose physical quantity is less than or equal to the first threshold, a first predetermined time elapses, which is estimated to be equivalent to a decrease in the physical quantity to less than or equal to the second threshold.

With the above configuration, a required torque from the motor is restricted when the seatbelt is taken up by the driving force of the motor in the event of a minor collision in preparation for multiple collisions. Hence, an increase in the size of the motor or a large current flowing through the motor to generate a high torque is avoided.

With the aspects of the disclosure, a required torque from the motor is restricted when the seatbelt is taken up by the driving force of the motor in the event of a minor collision in preparation for multiple collisions.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, example embodiments of the disclosure will be described with reference to the accompanying drawings.

Figure 1:
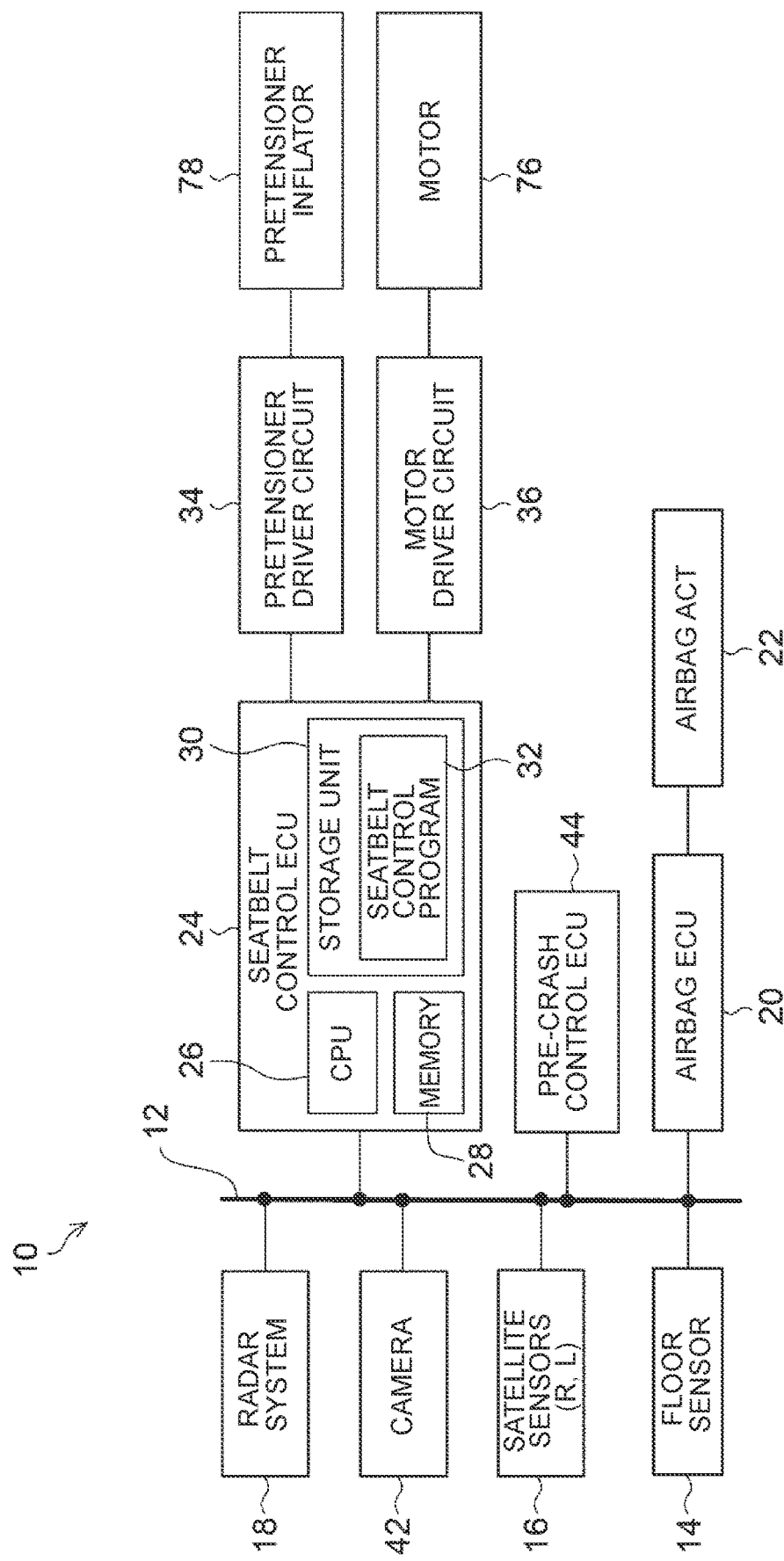
FIG. 1 is a schematic block diagram of an in-vehicle system according to embodiments.

An in-vehicle system 10 shown in FIG. 1 includes a bus 12. A plurality of sensor units and a plurality of electronic control units that execrate different control from each other are connected to the bus 12. FIG. 1 shows only part of the in-vehicle system 10.

Each of the electronic control units is a control unit including a CPU, a memory, and a nonvolatile storage unit, and is hereinafter referred to as ECU, The plurality of sensor units connected to the bus 12 includes a floor sensor 14, satellite sensors 16, a radar system 18, and a camera 42. The plurality of EC Us connected to the bus 12 includes an, airbag ECU 20, seatbelt control ECU 24, and a pre-crash control ECU 44. Hereinafter, pre-crash is abbreviated as PC.

Figure 2:
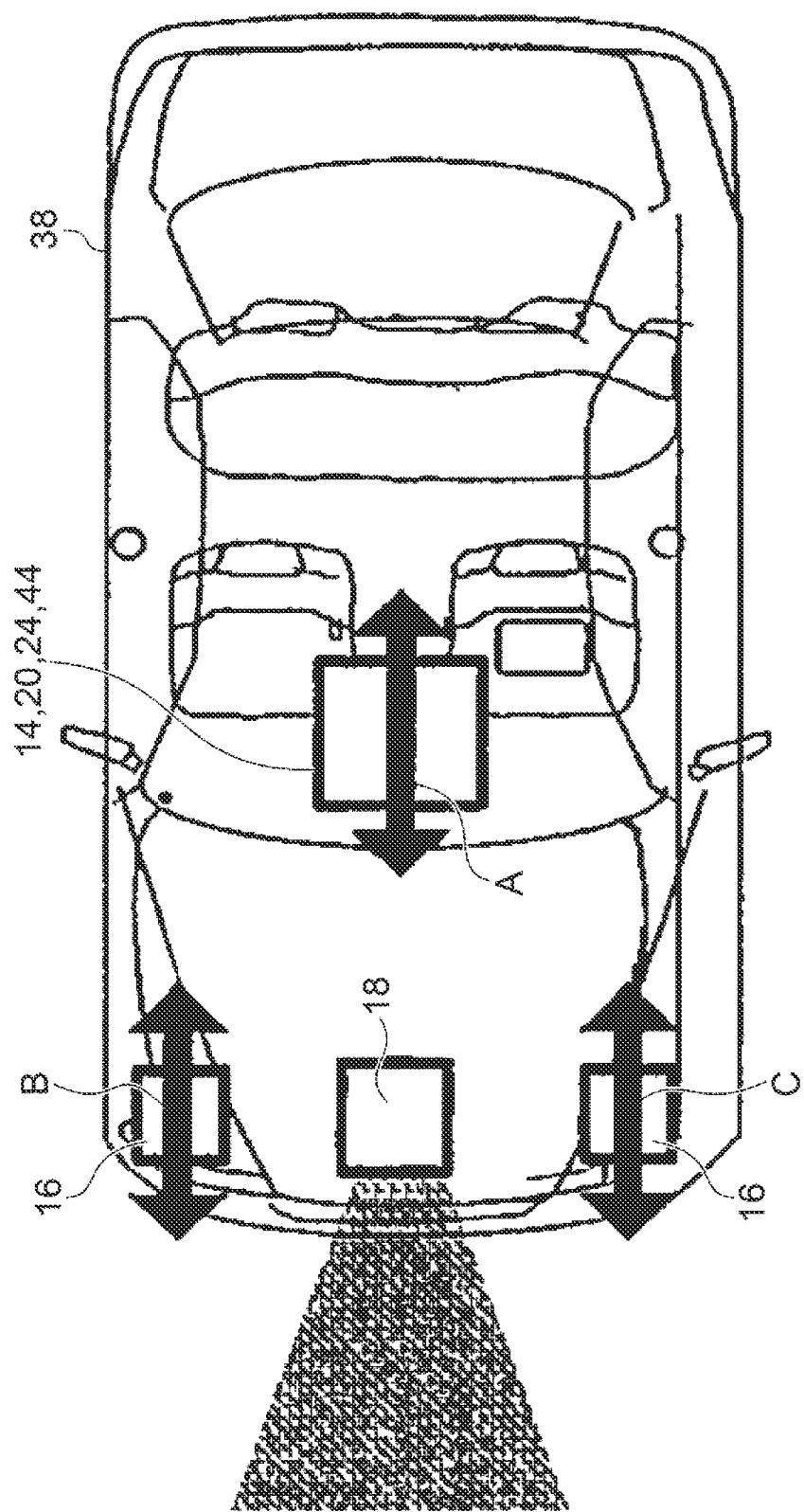
FIG. 2 is a plan view of a vehicle.

As shown in FIG. 2, the floor sensor 14 is disposed in a vehicle cabin of a vehicle 38 together with the airbag ECU 20, the seatbelt control ECU 24, and the PC control ECU 44. As represented by the arrow A in FIG. 2, the floor sensor 14 detects the acceleration (deceleration G) of the vehicle 38 in a front and rear direction in the vehicle cabin of the vehicle 38. As shown in FIG. 2, the satellite sensors 16 are respectively disposed on the right and left sides near the front end of the vehicle 38. As represented by the arrows B, C in FIG. 2, the satellite sensors 16 respectively detect the accelerations (decelerations Gs) of the vehicle 38 in the front and rear direction on the right and left sides near the front end of the vehicle 38.

The radar system 18 includes a plurality of radar devices having different detection ranges. The radar system 18 detects an object, such as a pedestrian and another vehicle, present in a detection range (represented by hatching in FIG. 2) ahead of the vehicle 38 as point information, and acquires the relative position and relative speed of the vehicle 38 to the detected object. The radar system 18 further includes a processor that processes a detection result of a surrounding object. The processor excludes noise, roadside objects, such as guard rails, or others, from targets to be monitored and keeps track of designated objects, such as pedestrians and other vehicles, as targets to be monitored based on changes, or the like, in relative positions or relative speeds to individual objects contained in latest multiple detection results. The radar system 18 outputs information, such as the relative positions or relative speeds to the individual objects to be monitored.

The radar system 18 functions as a collision prediction unit in cooperation with the camera 42 and the PC control ECU 44. The camera 42 captures an image around the vehicle 38. The PC control ECU 44 detects the positions of individual objects to be monitored from the image input front the camera 42 based on the information input from the radar system 18 (for example, the relative positions to the individual objects to be monitored, or others). The PC control ECU Id extracts the feature values of individual objects to be monitored and determines the types of the objects to be monitored (a pedestrian, a vehicle, or others) based on the extracted feature values. The PC control ECU 44 keeps track of objects to be monitored, present in a predetermined range by repeating, the above process and computes the probability of collision with the vehicle 38 one by one for each object to be monitored. When the PC control ECU 44 detects an object to be monitored, whose probability of collision with the vehicle 38 is higher than or equal to a predetermined value predicts a collision of the vehicle 38 with an object to be monitored), the PC control ECU 44 transmits a collision prediction signal to designated ECUs in the in-vehicle system 10, including the seatbelt control ECU 24.

Prediction of a collision is not, limited to using all pieces of information, which are input from the radar system 18 and the camera 42. For example, a collision can be predicted based on information that is input from one of the radar system 18 and the camera 42. A collision may be predicted by additionally using other information, such as the steering angle of a steering wheel of the vehicle 38.

An airbag actuator 22 that makes up an airbag system in cooperation with the airbag ECU 20 is connected to the airbag ECU 20. Hereinafter, actuator is abbreviated as ACT. The airbag ECU 20 causes the airbag ACT (inflator) 22 to deploy an airbag when, the deceleration G detected by the floor sensor 14 exceeds a threshold.

The seatbelt control ECU 24 includes a CPU 26, a memory 28, and a nonvolatile storage unit 30. A seatbelt control program 32 is, stored in the storage unit 30. The seatbelt control ECU 24 executes a seatbelt control process (described later) as follows. The seatbelt control program 32 is loaded from the storage unit 30 and expanded on the memory 28, and the seatbelt control program 32 expanded on the memory 28 is executed by the CPU 26.

A pretensioner inflator 78 is connected to the seatbelt control ECU 24 via a pretensioner driver circuit 34. A motor 76 is connected to the seatbelt control ECU 24 via a motor driver circuit 36. The seatbelt control ECU 24 controls ignition of the pretensioner inflator 78 via the pretensioner driver circuit 34 based on information that is input from the floor sensor 14 and the satellite sensors 16. The seatbelt control ECU 24 controls the drive of the motor 76 via a motor driver circuit 36 based on information that is input from the floor sensor 14 and the PC control ECU 44.

In the first embodiment, the floor sensor 14 is an example of a detector, and the seatbelt control ECU 24, the pretensioner driver circuit 34, and the motor driver circuit 36 are an example of an electronic control unit.

Figure 3:
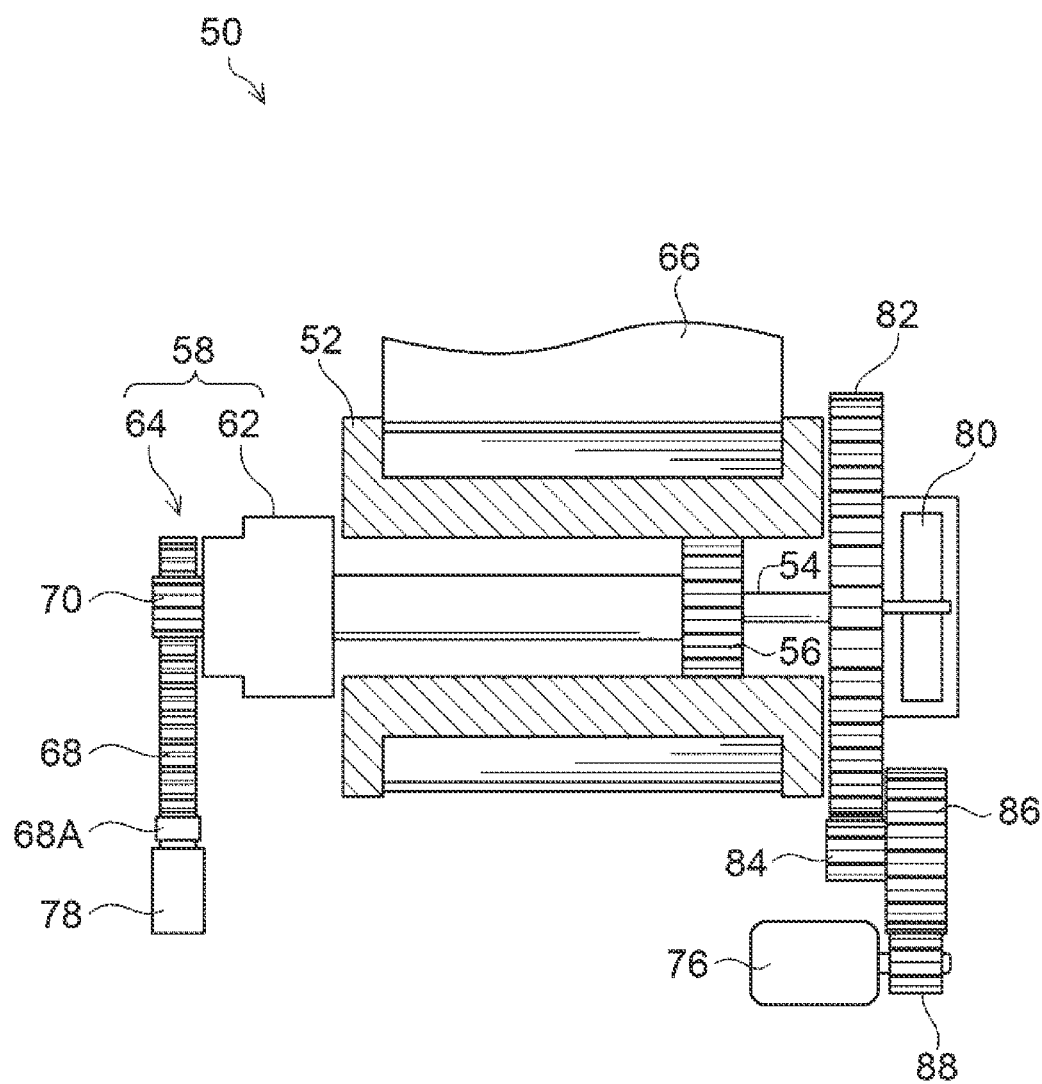
FIG. 3 is a schematic configuration diagram of a seatbelt take-up device.

As shown in FIG. 3, a seatbelt take-up device 50 includes a spool 52 that takes up a seatbelt 66. The spool 52 is hollow at its center. A torsion bar 54 is provided in the hollow portion. The torsion bar 54 is coupled to the spool 52 via a coupling member 56 at a position shifted toward a spring mechanism 80 (described later) from the center of the spool 52 in an axial direction, and functions as the rotary shaft of the spool 52. The torsion bar 54 has different diameters on both sides of the coupling member 56. In the present embodiment, a pretensioner unit 58 side of the torsion bar 54 is greater in diameter than a spring mechanism 80 side of the torsion bar 54.

The torsion bar 54 may have a structure such that the spring mechanism 80 side and the pretensioner unit 58 side may be integrated with each other or may have a structure such that the torsion bar 54 is split into the spring mechanism 80 side and the pretensioner unit 58 side and the spring mechanism 80 side and the pretensioner unit 58 side are coupled via the coupling member 56.

The pretensioner unit 58 is provided at one end of the torsion bar 54. The spring mechanism 80 is provided at the other end of the torsion bar 54. The spring mechanism 80 urges the spool 52 in a direction to take up the seatbelt 66. The pretensioner unit 58 includes a belt lock mechanism 62 and a pretensioner mechanism 64. The belt lock mechanism 62 locks the rotation of the spool 52 when a predetermined load is applied to the belt lock mechanism 62. Known various configurations are applicable as the belt lock mechanism 62, so the detailed description is omitted.

The pretensioner mechanism 64 includes the pretensioner inflator 78, a piston rack 68, and a pinion, gear 70. The pretensioner unit 58 is configured to take up the seatbelt 66 by a predetermined amount in the following manner. When the pretensioner inflator 78 is ignited to generate gas, a piston 68A of the piston rack 68 is pushed out, and the spool 52 is rotated by a rack gear of the piston rack 68 and the pinion gear 70.

On the other hand, when the seatbelt 66 is taken up as a result of activation of the pretensioner mechanism 64 of the pretensioner unit 58, the belt lock mechanism 62 locks when the seatbelt 66 is pulled out by the inertial movement of an occupant. After that, when a tension exceeding the predetermined load is applied to the seatbelt 66, the torsion bar 54 is twisted, the spool 52 coupled to the torsion bar 54 via the coupling member 56 rotates, and the seatbelt 66 is pulled out. In this way, the torsion bar 54 functions as a force limiter that moderates the tension of the seatbelt 66.

A spur gear 82 is provided between the spool 52 and the spring mechanism 80. The gear 82 is secured to the torsion bar 54. The gear 82 is in mesh with a spur gear 84. A spur gear 86 is provided coaxially with the gear 84. The gear 86 is integrated with the gear 84. A spur gear 88 is in mesh with the gear 86. The gear 88 is secured to the drive shaft of the motor 76. Thus, when the drive shaft of the motor 76 is rotated in a predetermined direction or in a direction opposite to the predetermined direction, the spool 52 is rotated in a direction to take up the seatbelt 66 or in a direction to pull out the seatbelt 66 via the gears 88, 86, 84, 82 and the torsion bar 54.

Figure 4:
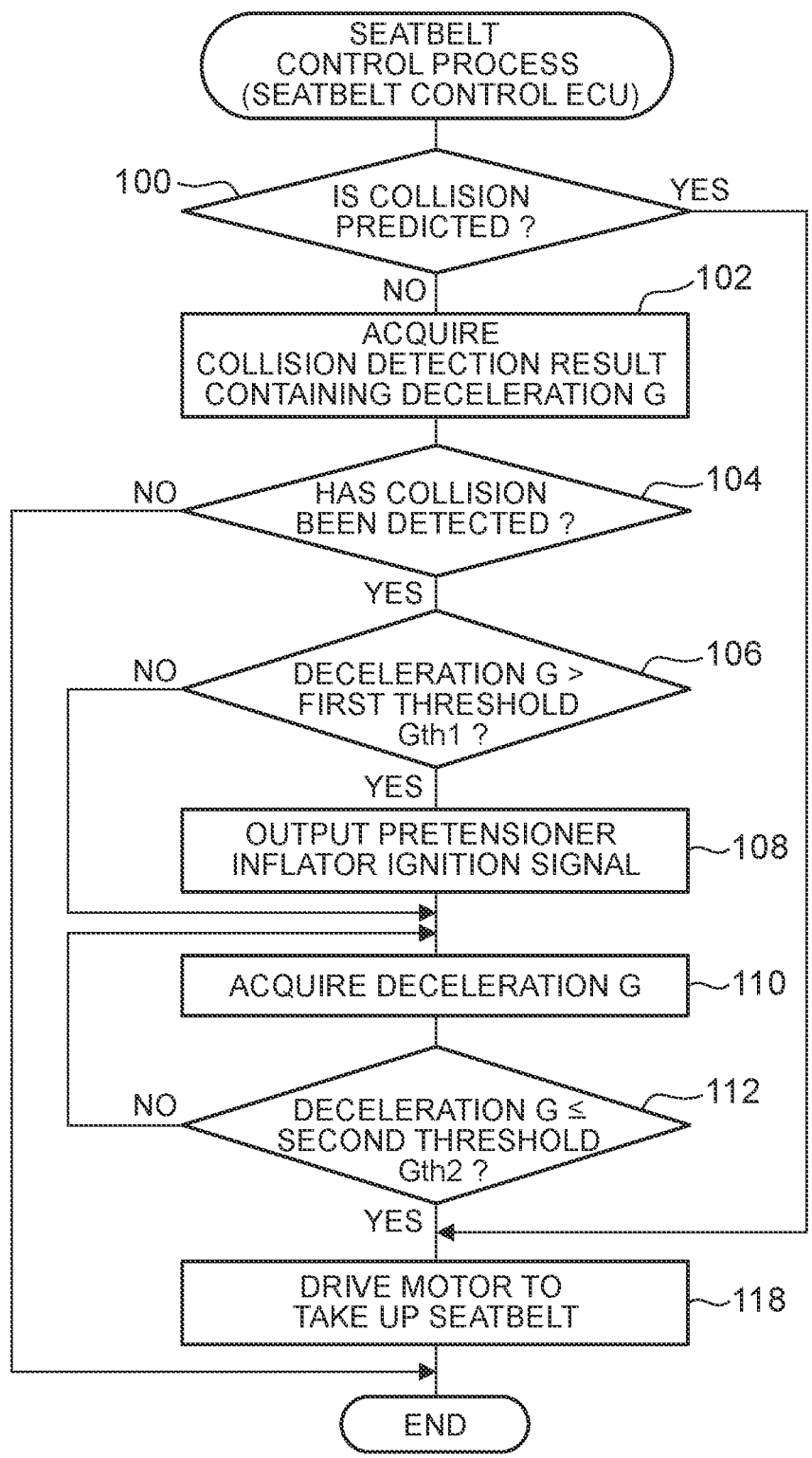
FIG. 4 is a flowchart that shows a seatbelt control process according to a first embodiment.

Next, the seatbelt control process that the seatbelt control ECU 24 repeatedly executes while an ignition switch of the vehicle 38 is on will be described as the operation of the first embodiment with reference to FIG. 4.

In step 100 of the seatbelt control process, the seatbelt control ECU 24 determines whether the vehicle 38 is predicted to collide with an object based on whether a collision prediction signal has been received from the PC control ECU 44. When the collision prediction signal has been received from the PC control ECU 44, the determination of step 100 is affirmative, and the process proceeds to step 118, In step 118, the seatbelt control ECU 24 drives the motor 76 in the direction to take up the seatbelt 66, and then ends the seatbelt control process.

In the stage where the vehicle 38 is predicted to collide with an object, the vehicle 38 has not collided with the object yet, so the tension of the seatbelt 66 is low. Therefore, the motor 76 is able to take up the seatbelt 66 with a low torque, and an occupant can be preliminary retrained by taking up the seatbelt 66.

When the determination of step 100 is negative, the process proceeds to step 102. In step 102, the seatbelt control ECU 24 acquires a collision detection result containing the deceleration G detected by the floor sensor 14 and the decelerations Gs detected by the satellite sensors 16. In step 104, the seatbelt control ECU 24 determines whether a collision of the vehicle 38 with the object has been detected based on the collision detection result acquired in step 102.

The determination of step 104 may be carried out as follows. For example, it is determined whether at least one of the deceleration G and the decelerations Gs exceeds a predetermined value (for example, a second threshold Gth2 (described later) or a value less than the second threshold Gth2), and, when the determination is affirmative, it may be determined that the collision has been detected. However, collision determination is not limited thereto. Various known techniques are applicable. For example, a pressure sensor may be provided in a bumper of the vehicle 38, and collision detection may be determined in consideration of whether a pressure is applied to the bumper. When the determination of step 104 is negative, the seatbelt control process is ended.

When the determination of step 104 is affirmative, the process proceeds to step 106. In step 106, the seatbelt control ECU 24 determines whether the deceleration (3 acquired in step 102 exceeds a preset first threshold Gth1.

When the determination of step 106 is negative, it may be determined that the current collision is a minor collision that does not need activation of the pretensioner unit 58 like, for example, the vehicle 38 obliquely collides with a guard rail. Even with a minor collision, a collision acceleration is applied to the occupant, so the occupant may be displaced to one side of a deployment range of the airbag. On the assumption that the current collision is the first collision among multiple collisions like, for example, the vehicle 38 obliquely collides with a guard rail and then collides with another vehicle on a lane on the other side, the displacement of the occupant to one side of the deployment range of the airbag at the time of occurrence of the second collision is not desirable from the viewpoint of occupant protection. However, just after a collision has been detected, the tension of the seatbelt 66 is increased because of application of a collision acceleration to the occupant even with a minor collision. To take up the seatbelt 66 in this stage, a high torque needs to be generated by the motor 76.

When the determination of step 106 is negative, the process proceeds to step 110. In step 110, the seatbelt control ECU 24 acquires the deceleration G detected by the floor sensor 14. In step 112, the seatbelt control ECU 24 determines whether the deceleration acquired in step 110 is less than or equal to the preset second threshold Gth2. The second threshold Gth2 is less than the first threshold Gth1. When the determination of step 112 is negative, the process returns to step 110, step 110 and step 112 are repeated until the determination of step 112 is affirmative.

Figure 5:
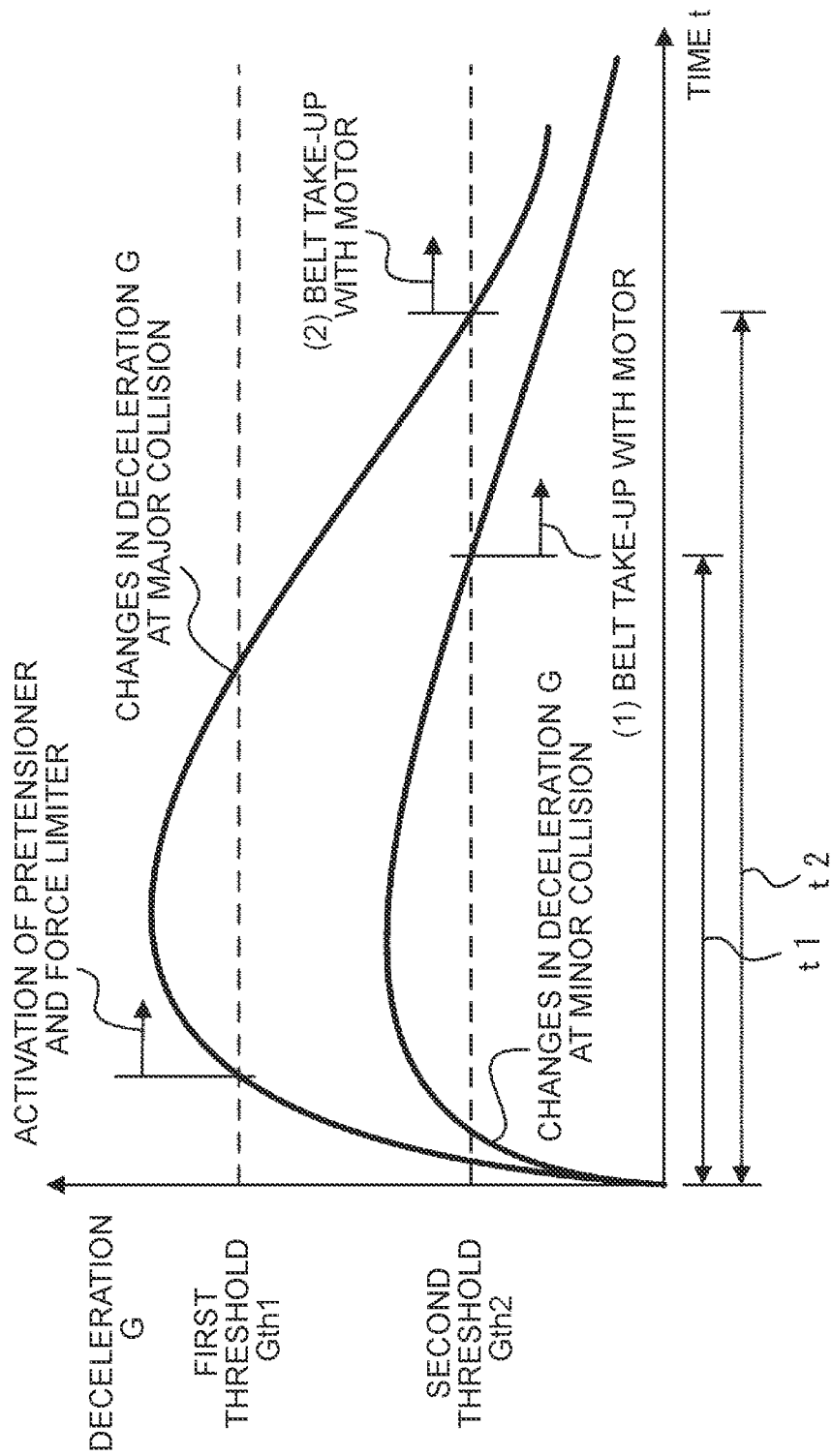
FIG. 5 is a timing chart that shows changes in deceleration when there occurs a collision.

FIG. 5 shows an example of changes in the deceleration G in the event of a minor collision. As shown in FIG. 5, the deceleration S decreases with time and becomes less than or equal to the second threshold Gth2. Thus, the determination of step 112 is affirmative, and the process proceeds to step 118. In step 118, the seatbelt control ECU 24 drives the motor 76 in the direction to take up the seatbelt 66 (see also (1) BELT TAKE-UP WITH MOTOR in FIG. 5). In this stage, the tension of the seatbelt 66 has been reducing, and the motor 76 is able to take up the seatbelt 66 with a low torque. Therefore, an increase in the size of the motor 76 or a large current flowing through the motor 76 to generate a high torque is avoided.

When the seatbelt 66 is taken up, even when the occupant is displaced to one side of the deployment range of the airbag, the one-side displacement of the occupant is returned. Therefore, even when the current collision is the first collision among multiple collisions, the occupant can be properly protected at the time of occurrence of the second collision.

When the determination of step 106 is affirmative, it is determined that the current collision is a major collision that needs activation of the pretensioner unit 58, so the process proceeds to step 108. In step 108, the seatbelt control ECU 24 outputs a pretensioner inflator ignition signal to the pretensioner driver circuit 34. Thus, the pretensioner driver circuit 34 ignites the pretensioner inflator 78, and, accordingly, the spool 52 is rotated by the pretensioner unit 58, and the seatbelt 66 is taken up, with the result that the occupant is restrained (see also ACTIVATION OF PRETENSIONER AND FORCE LIMITER in FIG. 5).

When there occurs a major collision and the pretensioner mechanism 64 of the pretensioner unit 58 is activated, the airbag ECU 20 activates the airbag ACT 22, and the airbag is deployed by the airbag ACT 22.

When the determination of step 108 is carried out, the process proceeds to step 110, and, as described above, acquisition of the deceleration G (step 110) and the determination as to whether the deceleration G is less than or equal to the second threshold Gth2 (step 112) are repeated. When the deceleration G decreases to less than or equal to the second threshold Gth2 with time, the determination of step 112 is affirmative, and the process proceeds to step 118, and then the motor 76 is driven in the direction to take up the seatbelt 66 (see also (2) BELT TAKE-UP WITH MOTOR in FIG. 5).

When the pretensioner mechanism 64 of the pretensioner unit 58 is activated, a slack of the seatbelt 66 can occur as a result of reduction of the tension of the seatbelt 66 to less than or equal to a predetermined value by the force limiter (torsion bar 54) thereafter. However, this slack can be taken up. Since the seatbelt 66 is taken up after the deceleration G becomes less than or equal to the second threshold Gth2, the motor 76 is able to take up the seatbelt 66 with a low torque. Therefore, an increase in the size of the motor 76 or a large current flowing through the motor 76 to generate a high torque is avoided.

Next, a second embodiment of the disclosure will be described. The second embodiment has the same configuration as the first embodiment, so like reference numerals denote the portions, and the description of the configuration is omitted.

Figure 6:
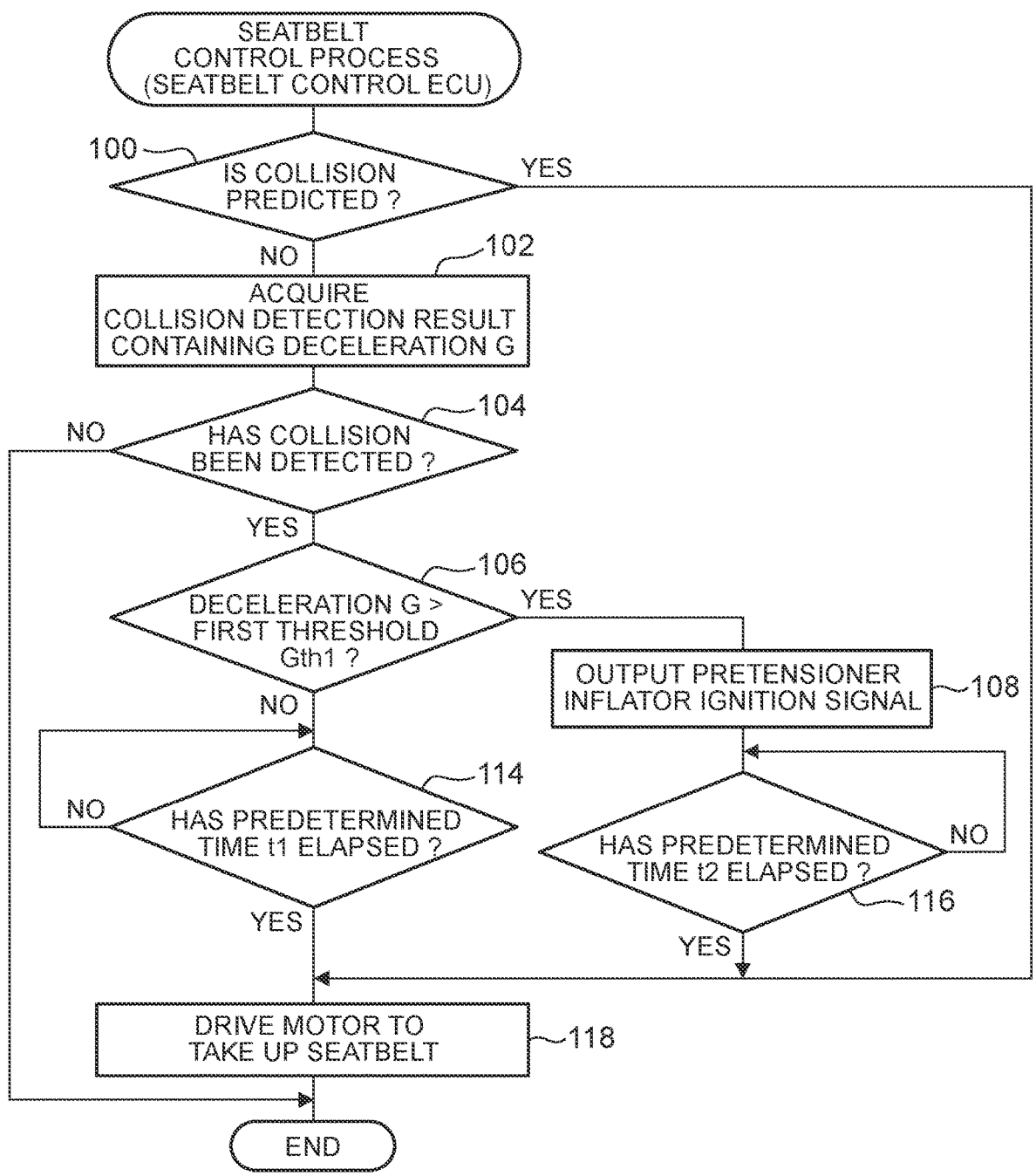
FIG. 6 is a flowchart that shows a seatbelt control process according to a second embodiment.

As shown in FIG. 6, a seatbelt control process according to the second embodiment proceeds to step 114 when the determination of step 106 is negative. In step 114, the seatbelt control ECU 24 determines whether a predetermined time t1 has elapsed from when the collision has been detected (from when the determination of step 104 is affirmative), step 114 is repeated until the determination is affirmative. As an example, as shown in FIG. 5, a time corresponding to a time required from occurrence of a minor collision until the deceleration G reduces to less than or equal to the second threshold Gth2 is set for the predetermined time t1.

When the predetermined time t1 has elapsed, the determination of step 114 is affirmative, and the process proceeds to step 118. In step 118, the motor 76 is driven in the direction to take up the seatbelt 66. In this stage, the tension of the seatbelt 66 has been reducing, and the motor 76 is able to take up the seatbelt 66 with a low torque. Therefore, an increase in the size of the motor 76 or a large current flowing through the motor 76 to generate a high torque is avoided. Even when the occupant is displaced to one side of the deployment range of the airbag, the displacement of the occupant is returned. Therefore, even when the current collision is the first collision among multiple collisions, the occupant can be properly protected at the time of occurrence of the second collision.

When the determination of step 106 is affirmative, the pretensioner mechanism 64 of the pretensioner unit 58 is activated in step 108, and then the process proceeds to step 116. In step 116, the seatbelt control ECU 24 determines whether a predetermined time t2 has elapsed from when the collision has been detected (from when the determination of step 104 is affirmative), step 116 is repeated until the determination is affirmative. As an example, as shown in FIG. 5, a time corresponding to a time required from occurrence of a major collision until the deceleration G decreases to less than or equal to the second threshold Gth2 is set for the predetermined time t2.

When the predetermined time t2 has elapsed, the determination of step 116 is affirmative, and the process proceeds to step 118. In step 118, the motor 76 is driven in the direction to take up the seatbelt 66. Thus, after the pretensioner mechanism 64 of the pretensioner unit 58 is activated, the tension of the seatbelt 66 is reduced to less than or equal to a predetermined value by the force limiter (torsion bar 54), with the result that a slack of the seatbelt 66 is taken up. Since the seatbelt 66 is taken up after the deceleration G becomes less than or equal to the second threshold Gth2, the motor 76 is able to take up the seatbelt 66 with a low torque. Therefore, an increase in the size of the motor 76 or a large current flowing through the motor 76 to generate a high torque is avoided.

A mode in which the floor sensor 14 detects the deceleration G as an example of a physical quantity associated with a magnitude of a collision is described; however, the physical quantity is not limited to the deceleration G. For example, an integral value of the deceleration G or a differential value of the deceleration G, a relative speed (collision speed V) of the vehicle 38 with an object, which is detected by the radar system 18, the size of a collision object, which can be detected from an image or the like captured by the camera 42, and others, may be used solely, or at least one of these pieces of information may be used in combination with the deceleration G.

The predetermined time t1 and the predetermined time t2 described in the second embodiment each may be a constant time; however, the predetermined time t1 and the predetermined time t2 are not limited thereto. Alternatively, for example, a time may be changed to extend with an increase in the deceleration G.

What is claimed is:

1. A seatbelt system for a vehicle, the seatbelt system comprising:
    a take-up device configured to take up a seatbelt by using driving force of a motor; and
    an electronic control unit configured to, when any one of a first condition and a second condition is satisfied, cause the motor to take up the seatbelt,
    the first condition being a condition in which, after occurrence of a collision whose physical quantity detected by a detector configured to detect the physical quantity associated with a magnitude of the collision is less than or equal to a first threshold, the physical quantity decreases to less than or equal to a second threshold less than the first threshold,
    the second condition being a condition in which, after the occurrence of the collision whose the physical quantity is less than or equal to the first threshold, a first predetermined time elapses, which is estimated to be equivalent to a decrease in the physical quantity to less than or equal to the second threshold.

2. The seatbelt system according to claim 1, wherein:
    the take-up device includes a pretensioner configured to increase a tension of the seatbelt by taking up the seatbelt; and
    the electronic control unit is configured to, when there occurs a collision whose the physical quantity exceeds the first threshold, activate the pretensioner.

3. The seatbelt system according to claim 2, wherein:
    the take-up device includes a force limiter configured to reduce the tension of the seatbelt taken up by the pretensioner to less than or equal to a predetermined value; and
        the electronic control unit is configured to, when any one of a third condition and a fourth condition is satisfied, cause the motor to take up the seatbelt, the third condition is a condition in which, after the pretensioner is activated, the physical quantity decreases to less than or equal to the second threshold, the fourth condition is a condition in which, after the pretensioner is activated, a second predetermined time elapses, which is estimated to be equivalent to a decrease in the physical quantity to less than or equal to the second threshold.

4. The seatbelt system of claim 1, wherein the first condition being the condition in which, after the occurrence of the collision whose physical quantity detected by the detector is less than or equal to the first threshold, the physical quantity decreases to less than or equal to the second threshold less than the first threshold with time, and
    the second condition being the condition in which, after the occurrence of the collision whose the physical quantity is less than or equal to the first threshold, the first predetermined time elapses, which is estimated to be equivalent to a decrease in the physical quantity to less than or equal to the second threshold with time.

5. The seatbelt system of claim 2, wherein the take-up device increases the tension of the seatbelt by taking up the seatbelt by activating a pretensioner inflator.

6. A control method for a seatbelt system, the seatbelt system including a take-up device configured to take up a seatbelt by using driving force of a motor, and an electronic control unit, the control method comprising controlling the motor by the electronic control unit such that the seatbelt is taken up by the motor when any one of a first condition and a second condition is satisfied, the first condition being a condition in which, after occurrence of a collision whose physical quantity detected by a detector configured to detect the physical quantity associated with a magnitude of the collision is less than or equal to a first threshold, the physical quantity decreases to less than or equal to a second threshold less than the first threshold, the second condition being a condition in which, after the occurrence of the collision whose the physical quantity is less than or equal to the first threshold, a first predetermined time elapses, which is estimated to be equivalent to a decrease in the physical quantity to less than or equal to the second threshold.

7. The control method of claim 6, wherein the first condition being the condition in which, after the occurrence of the collision whose physical quantity detected by the detector is less than or equal to the first threshold, the physical quantity decreases to less than or equal to the second threshold less than the first threshold with time, and
    the second condition being the condition in which, after the occurrence of the collision whose the physical quantity is less than or equal to the first threshold, the first predetermined time elapses, which is estimated to be equivalent to a decrease in the physical quantity to less than or equal to the second threshold with time.

8. The control method of claim 6, wherein the take-up device includes a pretensioner configured to increase a tension of the seatbelt by taking up the seatbelt; and
    the electronic control unit is configured to, when there occurs a collision whose the physical quantity exceeds the first threshold, activate the pretensioner.

9. The control method of claim 8, further comprising activating a pretensioner inflator to increase the tension of the seatbelt.

* * * * *

UNITED STATES PATENT AND TRADEMARK OFFICE
CERTIFICATE OF CORRECTION

| | | |
|---|---|---|
| PATENT NO. | : 11,235,722 B2 | Page 1 of 1 |
| APPLICATION NO. | : 16/597004 | |
| DATED | : February 1, 2022 | |
| INVENTOR(S) | : Nezaki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
Seventh Day of February, 2023

Katherine Kelly Vidal
*Director of the United States Patent and Trademark Office*